United States Patent
Pisaris-Henderson et al.

(10) Patent No.: US 8,626,576 B1
(45) Date of Patent: Jan. 7, 2014

(54) SYSTEM AND METHOD FOR MARKETING EMPLOYING THE DISTRIBUTION OF A PAY FOR PERFORMANCE DATABASE

(75) Inventors: Craig Pisaris-Henderson, Fort Meyers, FL (US); Anthony Garcia, Fort Meyers, FL (US)

(73) Assignee: Apple Inc., Cupertino, CA (US)

( * ) Notice: Subject to any disclaimer, the term of this patent is extended or adjusted under 35 U.S.C. 154(b) by 1116 days.

(21) Appl. No.: 09/781,500

(22) Filed: Feb. 12, 2001

Related U.S. Application Data

(60) Provisional application No. 60/181,918, filed on Feb. 11, 2000.

(51) Int. Cl.
*G06Q 30/00* (2012.01)

(52) U.S. Cl.
USPC .............................................. 705/14.1

(58) Field of Classification Search
USPC .................... 705/14, 26, 27, 79, 37, 14.1
See application file for complete search history.

(56) References Cited

U.S. PATENT DOCUMENTS

| | | | |
|---|---|---|---|
| 5,659,732 A | 8/1997 | Kirsch | 395/605 |
| 5,704,060 A | 12/1997 | Del Monte | 395/600 |
| 5,704,560 A | 1/1998 | Wimmer | 241/266 |
| 5,717,923 A | 2/1998 | Dedrick | 395/613 |
| 5,724,424 A | 3/1998 | Gifford | 380/24 |
| 5,724,521 A | 3/1998 | Dedrick | 395/226 |
| 5,724,524 A | 3/1998 | Hunt et al. | 395/237 |
| 5,748,954 A | 5/1998 | Mauldin | 395/610 |
| 5,752,238 A | 5/1998 | Dedrick | 705/14 |
| 5,768,521 A | 6/1998 | Dedrick | 395/200 |
| 5,778,367 A | 7/1998 | Wesinger, Jr. et al. | 707/10 |
| 5,794,210 A | 8/1998 | Goldhaber et al. | 705/14 |
| 5,826,241 A | 10/1998 | Stein et al. | 705/26 |
| 5,848,397 A | 12/1998 | Marsh et al. | 705/14 |
| 5,848,407 A | 12/1998 | Ishikawa et al. | 707/2 |
| 5,852,820 A | 12/1998 | Burrows | 707/2 |
| 5,855,008 A | 12/1998 | Goldhaber et al. | 705/14 |
| 5,862,223 A | 1/1999 | Walker et al. | 380/25 |
| 5,864,845 A | 1/1999 | Voorhees et al. | 707/5 |

(Continued)

FOREIGN PATENT DOCUMENTS

WO 0190917 11/2001 ............. G06F 17/00

OTHER PUBLICATIONS

Anonymous, Alien Artifact—See it, Business Wire, Dec. 21, 1999.*

(Continued)

*Primary Examiner* — Daniel Lastra
(74) *Attorney, Agent, or Firm* — Novak Druce Connolly Bove + Quigg LLP

(57) ABSTRACT

A system for marketing distribution over a computer data network includes at least one advertising client computer, at least one affiliate service provider computer coupled to the data network, a query client computer and a server computer which are coupled to the data network. The server computer maintains an advertiser account database and an advertiser keywords database which has a number of keyword entries and bids which are associated with advertising content pages of the advertising client computers. The server also includes a query processing subsection which is responsive to a search term entered on a query client computer provided to the server computer via one of the affiliate service provider computers. The query processing subsection returns search results to the query client which are ordered in accordance with the bid associated with the entries in the advertiser keyword database and have a link to the associated content pages.

31 Claims, 9 Drawing Sheets

(56) References Cited

U.S. PATENT DOCUMENTS

| | | | |
|---|---|---|---|
| 5,864,846 A | 1/1999 | Voorhees et al. | 707/5 |
| 5,903,882 A | 5/1999 | Asay et al. | 705/44 |
| 5,918,014 A | 6/1999 | Robinson | 395/200.49 |
| 5,920,854 A | 7/1999 | Kirsch et al. | 707/3 |
| 5,920,859 A | 7/1999 | Li | 707/5 |
| 5,930,474 A | 7/1999 | Dunworth et al. | 395/200.47 |
| 5,933,811 A * | 8/1999 | Angles et al. | 705/14.56 |
| 6,029,141 A * | 2/2000 | Bezos et al. | 705/27 |
| 6,078,866 A | 6/2000 | Buck et al. | 702/2 |
| 6,081,788 A | 6/2000 | Appleman et al. | 705/14 |
| 6,134,532 A | 10/2000 | Lazarus et al. | 705/14 |
| 6,269,361 B1 * | 7/2001 | Davis et al. | 1/1 |
| 6,285,987 B1 | 9/2001 | Roth et al. | 705/27 |
| 6,847,972 B1 * | 1/2005 | Vernau et al. | 1/1 |

OTHER PUBLICATIONS

Online article "GoTo Sells Positions", from *The Search Engine Report*, Mar. 3, 1998, pp. 1-5.
Online article by Nick Wingfield, "Engine sells results, draws fire", Special to CNET News.com, Jun. 21, 1996, pp. 1-3.
Online Search Engines, www.goto.com/d/search-results, Aug. 19, 1998, pp. 1-5.
Online "Advertiser FAQ on Getting Listed", Aug. 24, 1998, pp. 1-7, www.goto.com/d/about/advertisers/faq.jht.
Online "Help & Hints Table of Contents", Jun. 13, 1998, pp. 1-9, http://sirocco.northernlight.com/docs/prod_help.htm.
Online Search Results, Jun. 13, 1998, pp. 1-2, http://sirocco.northernlight.com/docs/prod_help.htm.
Online "Stock Generation Virus Stock Exchange", Jun. 13, 1998, pp. 1-4, http://sirocco.northernlight .com.
Online press release "GOTO.COM Combines Inktomi Search Capability with Their Driven Advertising Model", (for Jun. 15, 1998) pp. 1-3.
Arnon et al., Using Structured Documents for Implementing Product/Service Yellow Pages Architecture on the Internet, *Proc. of the Ann. Workshop on Info. Tech. and Sys*. 312-21 (Dec. 17, 1994).
*IBM Technical Disclosure Bulletin*, Organizing a Ranked List of Search Matches (Nov. 1, 1994).
Tom Williams, *Telephony*, BellSouth, Pac Bell make big investment in billing systems, (May 1, 1995).
Rose Aguilar, CNET_News.com, *New ad model charges by the click* (Apr. 29, 1996).
Nick Wingfield, CNET_News.com, *Another engine takes ads by the click* (May 22, 1996).
Adriaan van Roeden, *Web Techniques*, Your Own Search Engine with SWISH (Nov. 1996).
Alex Lash, CNET_News.com; *Open Text updates tools* (Dec. 11, 1996).
Jeff Frentzen, *PC Week*, Help for getting the word out about web sites (Nov. 3, 1997).
*The Search Engine Report*, Lycos Adds Predetermined Listings (Dec. 4, 1997).
Kim Komando, *Los Angeles Times Syndicate*, With about 320 million sites, search engines offer some help (1998).
Karen L. Miller, *Home Office Computing*, Improve your ranking. (building Web sites to attract Web services) (Jan. 1998).
*The Search Engine Report*, Lycos Adds New Features, Reorganizes Suggested Links (Jan. 9, 1998).
Jeff Pelline, CNET_News.com, *New Search Engine goes commercial* (Feb. 18, 1998).
Jeff Pelline, CNET_News.com, *Pay-for-placement gets another shot* (Feb. 19, 1998).
Jodi Mardesich, *San Jose Mercury News*, Web Operators Pay to get Top billing (Feb. 23, 1998).
Don Clark, *Wall Street Journal*, Start-Up Plans Internet Search Service Tying Results to Advertising Spending (Feb. 20, 1998).
Ken Glaser, OnlinePress.com, *Who Will GoTo.com*? (Feb. 20, 1998).
Jodi Mardesich, *Knight Ridder*, Those Who Pay Get Top Billing in Searches (Mar. 10, 1998).
Susan Povich, *Internet Advertising/Marketing Law Report*, Marketer-Driven Search Engine Debuts Feb. 21 (Feb. 20, 1998).
Press Release, GoTo.com, *The First Ever Market-Driven Search Directory* (Feb. 21, 1998).
Jodi Mardesich, *San Jose Mercury News*, Search engine charges hit sites (Feb. 21, 1998).
Jon Swartz, *San Francisco Chronicle*, Browser Only Lists Paying Web Sites (Feb. 21, 1998).
Nelson Wang, *Internet World*, Engines Battle Irrelevance of Results. (Feb. 23, 1998).
Patricia Riedman, *Advertising Age*, Search engine startup to auction listings (Feb. 23, 1998).
Jodi Mardesich, *Knight Ridder*, Latest Search Engine Provides Sites With Top Billing—but for a price (Mar. 1, 1998).
Brian McWilliams, *PC World*, Search Engine to Sell Top Positions on results Lists (Feb. 23, 1998).
Laura Rich, *AdWeek*, New Search engines Allows Sites to Pay Their Way to Top (Feb. 23, 1998).
Steven Vonder Haar, *ZDNet*, Searching for the Highest Bidder (Feb. 19, 1998).
Patrick McKenna, *ZDNet Newsbytes*, New Search Engines GoTo Charges for Hits (Feb. 23, 1998).
Jennifer Hillner, *Wired Digital*, GoTo Searches With a Capitalist Engine (Feb. 24, 1998).
Gazzette_World.com, *Gazzette—Issue #43*, The Coming Trend, (Feb. 27, 1998).
*The Search Engine Report*, GoTo Sells Positions (Mar. 3, 1998).
Staff and wire reports, *Roanoke Times & World News*, Businesses May Buy Rank on Internet Search Engine (Mar. 10, 1998).
Wyn Hilty, *OC Weekly*, GoTo.Hell. What Happens when an online search engine accepts cash from Web sites (Mar. 11, 1998).
Laurie J. Flynn, *The New York Times*, With GoTo.com's Search Engine, the Highest Bidder Shall Be Ranked First (Mar. 16, 1998).
David Coursey, (Coursey.com) *David Coursey's Insider Report on Personal Computing, the Internet, and Communications* (Mar. 18, 1998).
A Closer Look, *Wall Street Journal*, A CloserLook, Going, Going . . . (Apr. 2, 1998).
Randal L. Schwartz, Web_Techniques.com, *Programming With Perl: Click-Through Tracking in Perl* (May 1998).
Sasha Alyson, *Advertising Age Interactive Daily Homepage. Front Page* Searching the Search Engines (May 8, 1998).
Press Release, *GoTo*, GoTo.com Announces First Round of Financing Totaling More Than $6 Million, Led By Draper Fisher Jurvetson (Feb. 23, 1998).
Saul Hansell, *The New York Times*, Alta Vista Invites Advertisers to Pay for Top Ranking (Apr. 15, 1999).
Paul Gilster, *The News and Observer* (Raleigh, NC) A Free-enterprise system drives this search engine (Mar. 3, 1998).
Chet Dembeck, *E-Commerce Times*, Will GoTo.com Become the Model Search Engine? (May 27, 1999).
Steven P. Ketchpel, et al.., *The Second USENIX Workshop on Electronic Commerce Proceedings*, U-Pai: A Universal Payment Application Interface (Oakland, California, Nov. 18-21, 1996).
*Target Marketing*, Advertising Done Your Way, (Oct. 1997).
Archive at http://www.doubleclick.com/nf/adinfo/testiset.htm, *DoubleClick TestIt*, (Feb. 5, 1998).
Archive at http://www.doubleclick.com/nf/adinfo/faq1set.htm, DoubleClick Frequently Asked Questions (Feb. 5, 1998.
Jason Pontin, *Red Herring Magazine*, Gross Idea (May 1, 1998).
The Product Solutions Catalog publickly available at solutions.sun.com prior to May 28, 1998, *Sun Solutions Catalog*.
Jeffrey Brewer (jeffrey@goto.com), *Need Reverse Stemming Software*, Usenet news group posting (May 27, 1998) as archived at http://groups.findwhat.com/groups?selm=_356CEE4A.8DE882A8%40goto.com.

* cited by examiner

SYSTEM AND METHOD FOR MARKETING EMPLOYING THE DISTRIBUTION OF A PAY FOR PERFORMANCE DATABASE

This application claims the benefit of U.S. Provisional Application Ser. No. 60/181,918 entitled "PAY FOR PLACEMENT SEARCH ENGINE WITH REAL-TIME ACCOUNT PROCESSING" which was filed on Feb. 11, 2000.

FIELD OF THE INVENTION

The present invention relates generally to marketing distribution via a computer network and more particularly relates to systems and methods for marketing using the distribution of a pay for performance search database using a network of affiliate service providers.

BACKGROUND OF THE INVENTION

The Internet has quickly grown from an obscure resource for high level researchers to a ubiquitous resource having hundreds of millions of pages of content which is accessible by millions of users. To locate and access specific information of interest within this vast collection of distributed content, various search engines exist which query the pages of content on a continuous basis and generate a searchable database in which the various pages of content are listed. A user desiring access to content enters a set of search terms in a search engine which are believed to be relevant to the desired content. A list of content pages which match some relevancy criteria is provided by the search engine in response.

There are numerous search engines, such as www.excite.com, www.yahoo.com, www.altavista.com and www.google.com, which provide such a service. While the particulars of each search algorithm differ, each of these search engines provide results which are listed by some algorithmically determined relevancy measure.

An alternative to the computer generated relevancy measure which is provided by a number of conventional search engines, some search engines, such as www.goto.com, provide a pay for placement feature which effects where particular content will be listed in response to a user search. In this pay for placement model, advertisers pay a bid amount for certain keywords which are expected to be relevant to the goods and services offered on the content pages they provide. If a user's search includes a keyword which has been purchased by one or more advertisers, these content pages will be listed with a higher priority, in descending order, starting from the highest bidding advertising. In the goto.com pay for placement model, advertisers pay the bid amount when a user clicks on the displayed content page listing, which provides a hypertext link to the advertisers content pages. The pay for placement model results in the generation of a database of advertisers which are willing to pay a certain denomination when a user actively clicks on a listing. However, in known search engines, this database is only accessible through the search service provider's own Internet webpage, which limits the reach of this service to advertisers. In other words, the scope of access to such a search engine is directly related to the brand recognition of the search engine.

OBJECTS AND SUMMARY OF THE INVENTION

It is an object of the invention to provide a system and method for marketing which uses the broad distribution of access to a pay for performance database of advertisers as a marketing vehicle.

It is a further object of the invention to distribute access to a pay for performance database to a large number of unique users through a network of affiliate service providers.

It is a further object of the invention to provide a system and method of marketing wherein advertisers and affiliate service providers can assess the performance of their participation in the system in real time.

A system for marketing distribution over a computer data network in accordance with the invention includes at least one advertising client computer, at least one affiliate service provider computer, at least one query client computer and a server computer which are coupled to the data network. The server computer maintains an advertiser account database and an advertiser keywords database which has a number of keyword entries and entry denominations which are associated with advertising content pages of the advertising client computers. The server also includes a query processing subsection which is operatively coupled to the advertiser keywords database. The query processing subsection is responsive to a search term entered on a query client computer which is provided to the server computer via one of the affiliate service provider computers. The query processing subsection returns search results to the query client which includes those entries in the advertiser keywords database which match the search term entered by the query client computer. The search results are ordered in accordance with the denomination associated with the entries in the advertiser keyword database and have a link to the associated content pages. The denomination provides a pay for performance aspect to the search results. Advertisers pay the amount of the denomination when the entry is selected by the client. Affiliate service providers are credited an amount, such as a portion of the denomination, when the entry is selected by the client. The use of a number of affiliate service providers expands access to the advertiser keyword database to a large number of unique users.

Preferably, at the time an advertiser enters a bid on a selected keyword, the server performs a relevancy determination prior to accepting the bid amount. In performing the relevancy determination, the site title, description and/or content are compared against the selected keyword to determine if the keyword satisfies a minimum relevancy measure. The relevancy determination can include a thesaurus, synonym checker and a category/association groupings database. In the event that the automated relevancy determination algorithm rejects the bid, the advertiser can select a different keyword or submit the keyword to a human operator associated with the server to make a final determination of relevancy. This minimum relevancy measure prevents advertisers from placing a bid on non-relevant keywords and insures that the results which are provided to users are relevant to the search query.

Preferably, the server computer also includes an account processing subsection which allows authorized users to view and modify the contents of the account database and the advertiser keywords database.

A method for marketing distribution over a computer network in accordance with the present invention includes maintaining an advertiser keyword database having a plurality of entries which are associated with advertising content. Each of the entries includes at least one keyword and a denomination associated with the keyword. A search interface is provided to a number of affiliate service providers which in turn provides access to the advertiser keyword database for users of the affiliate service providers. At least one keyword which is entered in the search interface by a user of an affiliate service provider is used to search the advertiser keyword database to find entries which match the at least one keyword entered in the search. Entries in the advertiser keyword database which match the keywords from the search are provided to the user of the affiliate service provider. The search results are sorted in order in accordance with the denominations associated with the entries. The method further includes determining if the user selected at least one of the entries from the search results and, if so, debiting an advertisers account for the value of the denomination associated with the selected entry.

As in the system setforth above, it is preferable for the keywords selected by the advertiser to be subjected to a relevancy determination to insure that the selected keywords are appropriate for the advertisers content pages. When an advertisers selects a keyword and places a bid, the bid will only be accepted if a minimum relevancy threshold is satisfied. Only those advertisers whose content satisfies the minimum relevancy threshold will be listed among the pay for performance results.

Preferably, the method further includes crediting the account of the affiliate service provider, such as with a portion of the denomination associated with the selected entry.

It is also preferred that the accounts of the affiliate service provider and the advertisers be accessible to authorized users in real time. This allows the keywords to be altered and the denominations associated with the keywords to also be altered to improve the performance of the marketing method.

DETAILED DESCRIPTION OF PREFERRED EMBODIMENTS

Figure 1:
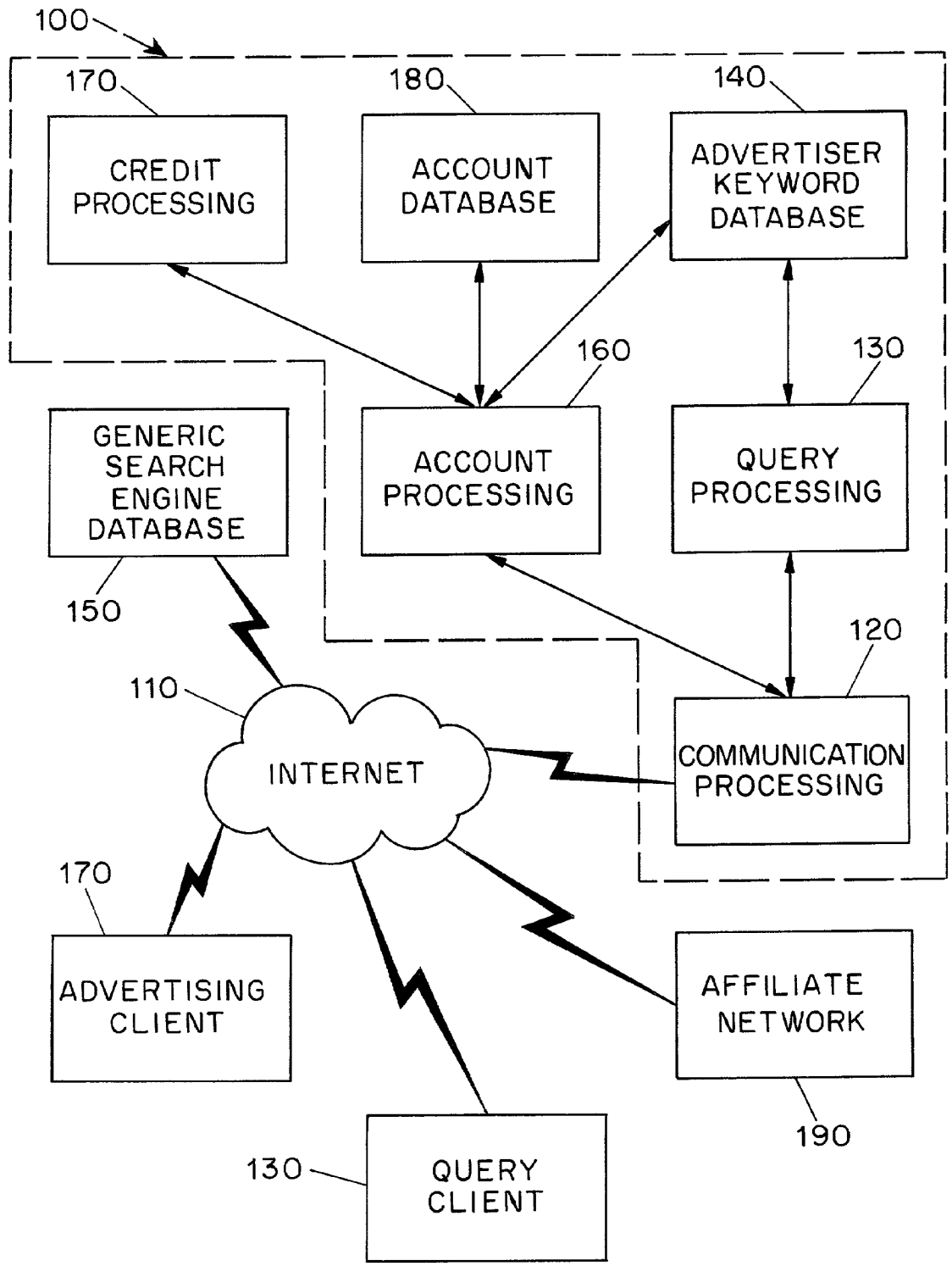
FIG. 1 is a simplified block diagram of a system for practicing the present marketing method wherein search engine front end functionality is distributed to a plurality of affiliate service providers to allow broad access to a pay for performance database with real time account processing.

FIG. 1 is a simplified block diagram of a system for practicing the present marketing method which involves distributing a pay for performance database to query clients via search engine front-end software which is distributed to a number of affiliate service providers. The system includes a server 100 which is operatively coupled to a data network 110, such as the Internet, via appropriate communication processing and I/O circuitry 120 which are well known in the art. The server 100 maintains the pay for performance database, performs query processing and also performs account processing functions.

In query processing, when a key word search is entered by a query client 130, which is a remote computer, network appliance or set top box, coupled to the server 100 via the Internet 110, the communication processing block 120 passes the search query to a query processing block 130. The query processing block 130 submits the keyword search to both a proprietary pay-for placement advertiser keyword database 140 in the server 100 and a generic search engine database 150 via the Internet 110.

The generic search engine database can take the form generally known in the art which are generated by various web crawler and web spider techniques, such as the database offered by Inkotomi. The query processing block 130 can receive relevant responses to the keyword search inquiry from both the generic search engine database 150 and from the pay-for-performance 140. The results are merged by the query processing block 130 with the results from advertiser keyword database 140 having priority over the results from the generic search engine database 150. The results from the advertiser keyword database 140 are further sorted in descending order based on a denomination associated with the keyword in the advertiser keyword database 140, which is generally a cash amount paid per "click through" by advertisers purchasing the keywords. In this way, the advertiser keyword database 140 is a pay-for-performance database.

Prior to adding an entry in the advertiser keyword database 140, the server can perform a relevancy algorithm which determines if the advertiser's content satisfies a minimum relevancy measure compared to the selected keyword. Various levels of relevancy measures can be used. For example, as a first relevancy measure, the title, description and content of the advertiser's website can be evaluated to determine if the selected keyword, or an equivalent from a thesaurus database, are present. An additional relevancy measure can be to evaluate the content of the advertiser's web page to determine the categories of goods and services which are being offered by the advertiser and then comparing the selected categories to potential categories for the selected keywords. For example, for a keyword FISHING, several categories of content such as watersports, fishing, bait & tackle, wilderness travel, sporting goods, etc., would be appropriate. If the advertiser's content did not appear to fall within one of the categories, the bid can be rejected and the advertiser can select a different keyword or request manual review by a human operator. By including an initial relevancy screening at the keyword selection process, the integrity of the pay-for-performance results which are returned to a ser in response to a search having a selected keyword are insured.

Figure 2:
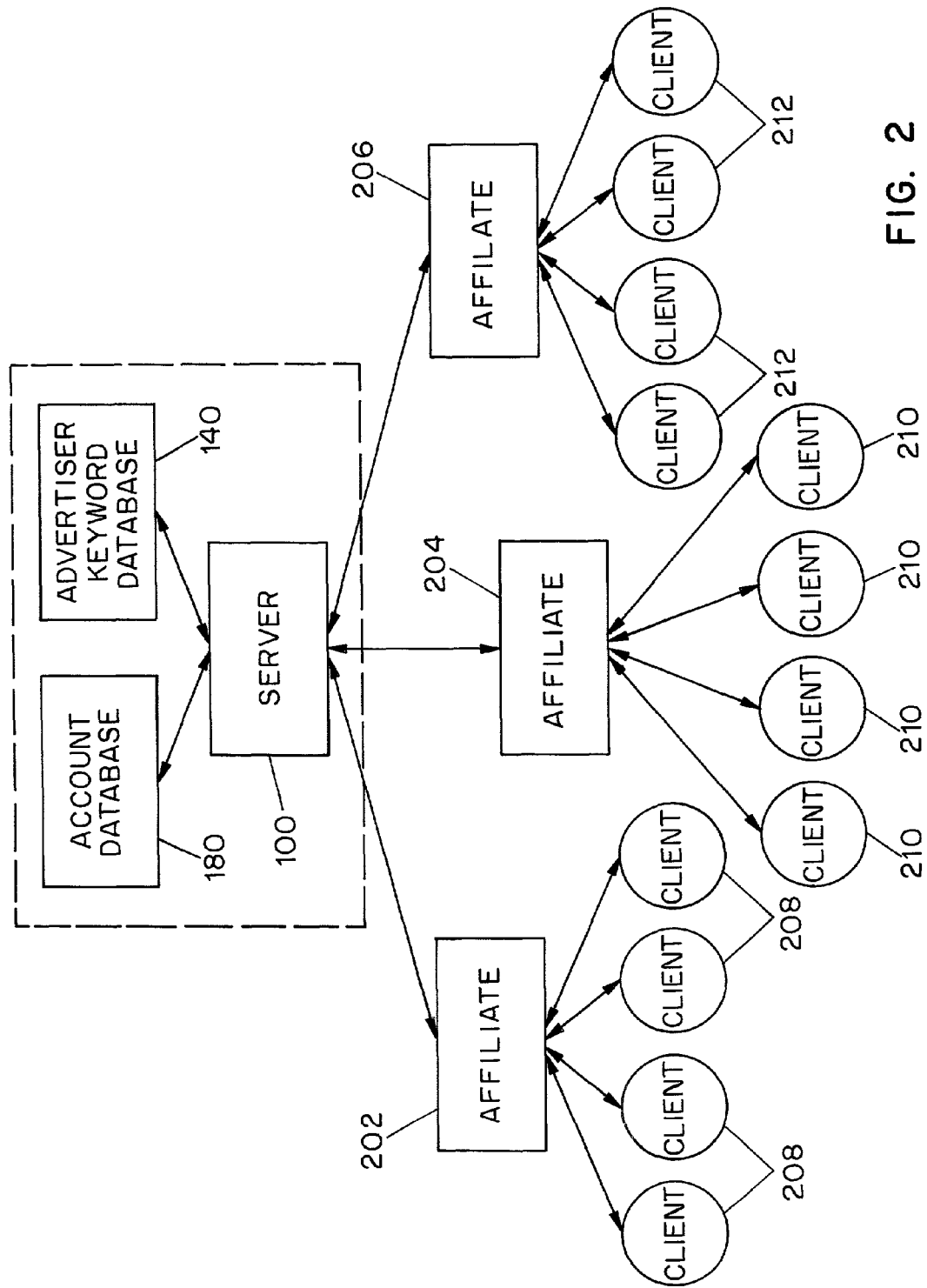
FIG. 2 is a pictorial representation illustrating the system hierarchy where a server is associated with a number of affiliate service providers, which in turn service a number of query clients.

FIG. 2 is a block diagram which illustrates the hierarchy of the present system and method for distributing access to and results from a pay for performance database. The system includes the server 100 which is coupled to a large number of affiliate service provider computers 202, 204, 206. While three such affiliate service provider computers are illustrated, there is no limit on the number of such affiliates and a typical system will preferably involve hundreds, or thousands of such affiliates. The affiliate service provider computers can be almost any computer connected to the data network which have content of interest to a number of users. The affiliate service provider computers can be community sites, content sites, special interest sites and the like. Each affiliate service provider computer 202, 204, 206 has an associated group of clients 208, 210, 212 which are associated therewith. The clients are simply users of the computer network which access the content and or services of the affiliate service provider computer. Although, as the number of affiliates increases the amount of overlap in clients 208, 210, 212 associated with the affiliates 202, 204, 206 also increases, there is a substantial number of unique clients associated with each affiliate service provider. Thus, the use of an affiliate network 190 provides the server 100 with access to a large number of clients. The lines shown between the clients 208, 210, 212 and affiliate service providers 202, 204, 206 illustrate an association or affiliation, rather than a physical connection. As described in connection with FIG. 1, the client computers, affiliate service providers and server 100 are generally coupled to a public data network, such as the Internet, where mutual bidirectional communication is facilitated.

Figure 3:
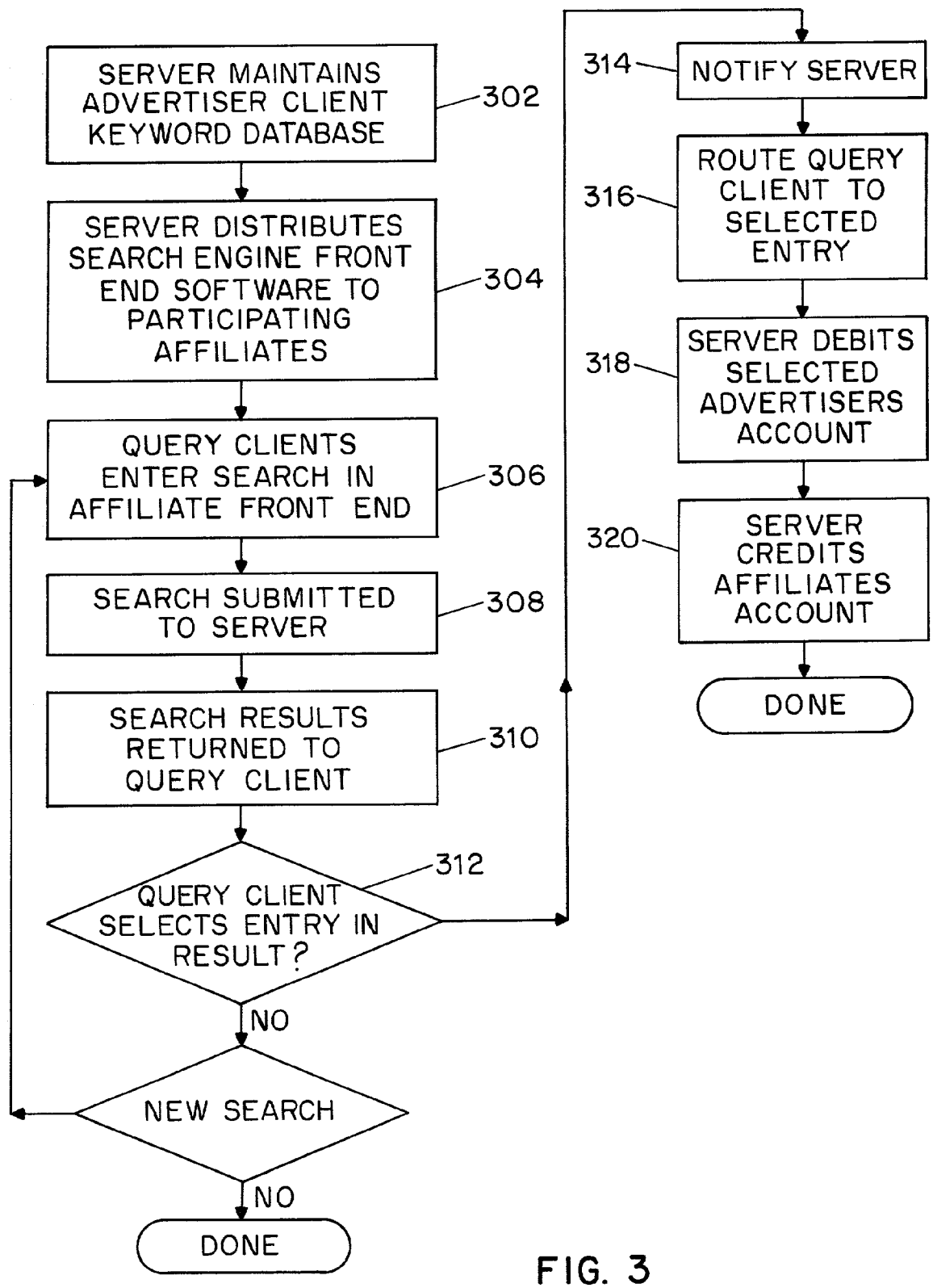
FIG. 3 is a flow chart illustrating a marketing method employing the distribution of pay for performance search results through a network of affiliate service providers.

FIG. 3 is a flow chart which further illustrates the interaction between the server 100, affiliate service providers 202, 204, 206 and clients 208, 210 and 212. As illustrated in FIGS. 1 and 2, the server 100 maintains an advertiser client keyword database 140 (step 302). In this database, the server 100 stores a list of keywords which have been bid on by one or more advertisers along with associated denominations, or bid amounts, for the keywords. The advertisers can review this database and determine their placement in a search which includes a particular search term by comparing the bid price they are willing to pay when a client selects there content as compared to competitive bid prices for the same keyword. The server also includes a query processing subsystem 130 which allows client queries to be parsed and compared against the advertising keyword database 140 to determine if there is one or more match.

In order to participate in the system, the affiliate service providers 202, 204, 206 must have appropriate affiliate software which provides a search term entry field to the client computers, passes the search terms entered by the clients to the server 100 and allows the search results to be returned to the clients. The affiliate software also provides a mechanism for reporting to the server 100 when a client selects an entry from the search results for subsequent account processing and routing.

Returning to FIG. 3, the affiliate software is preferably distributed to the affiliate service provider by the server 100 via the Internet network connection (step 304). Of course, computer readable media with the affiliate software thereon can also be provided to the affiliate if desired. The affiliate software will present a search term entry field on the affiliate service provider Internet content page where a client 208, 210, 212 can enter one or more search terms (step 306). When the client enters a search term, the affiliate software submits the search to the server 100 for query processing (step 308). The search results from the server 100 are then returned to the client. Preferably, the search results include both the direct hits in the advertiser keyword database 140 followed by the results from a conventional generic search engine database 150, such as that provided by Inkotomi, Inc (step 310). The results can be provided to the client by passing the data to the affiliate service provider 202, 204, 206, or by temporally linking the client to a separate web page provided by the server 100. Generally, the search results take the form of a list of titles and descriptions of relevant content along with a hypertext link to the content. For those results which are provided from the advertiser keyword database, an indication of the price paid by the advertiser for such ranking may also be provided.

To select content of interest from the search results, the client selects the entry, such as by clicking on the entry using a graphical user interface (GUI) at the client location. If the query client selects an entry in the search result (step 312), the server is notified of the selection (step 314). The notification can take the form of a message provided by the affiliate network provider, or can take the form of routing the client through the server 100 or associated redirect computer on the way to the destination of the selected content. In either case, the client will be routed to location of the selected content, which is generally specified as a network address or uniform resource locator (URL) (step 316).

The notification to the server in step 314 provides an indication of the affiliate service provider which referred the client as well as an indication of the content that was selected. From this information, the server 100 can perform account processing. The account processing includes debiting the advertiser of the selected content the denominated bid amount for the client's "click-through" to the advertisers content (step 318). A portion of the proceeds from the advertiser, or some other fee arrangement, is attributable to the affiliate service provider as compensation for the referral. Therefore, the account processing also includes crediting the account of the affiliate for the appropriate sum (step 320).

The account processing will be described in further detail with respect to FIG. 1. As noted above, the advertiser keyword database 140 provides a list of advertisers who have placed bids for premium placement in results for queries using particular search terms, or keywords. To effect this operation, the server 100 includes an account processing block 160. The account processing block 160 is coupled to advertising clients 170 via the Internet 110. The account processing block allows advertisers to bid for various keywords in real time, open a payment account in real time, and access keyword performance data in real time.

The account processing block 160 is coupled to a credit processing block 170 which communicates with remote credit providers to establish an advertiser account in real time. To open an account, a prospective advertising client 170 provides accessible credit information, such as credit card, debit card, or online account information to the server 100 which authenticates the credit information and effects a fund transfer from the remote credit account to an advertiser account stored in an account database 180.

The account processing block 160 provides numerous account features which allow an advertising client to efficiently select keywords, bid on keywords and evaluate the performance of various keywords, all in real time.

Figure 4:
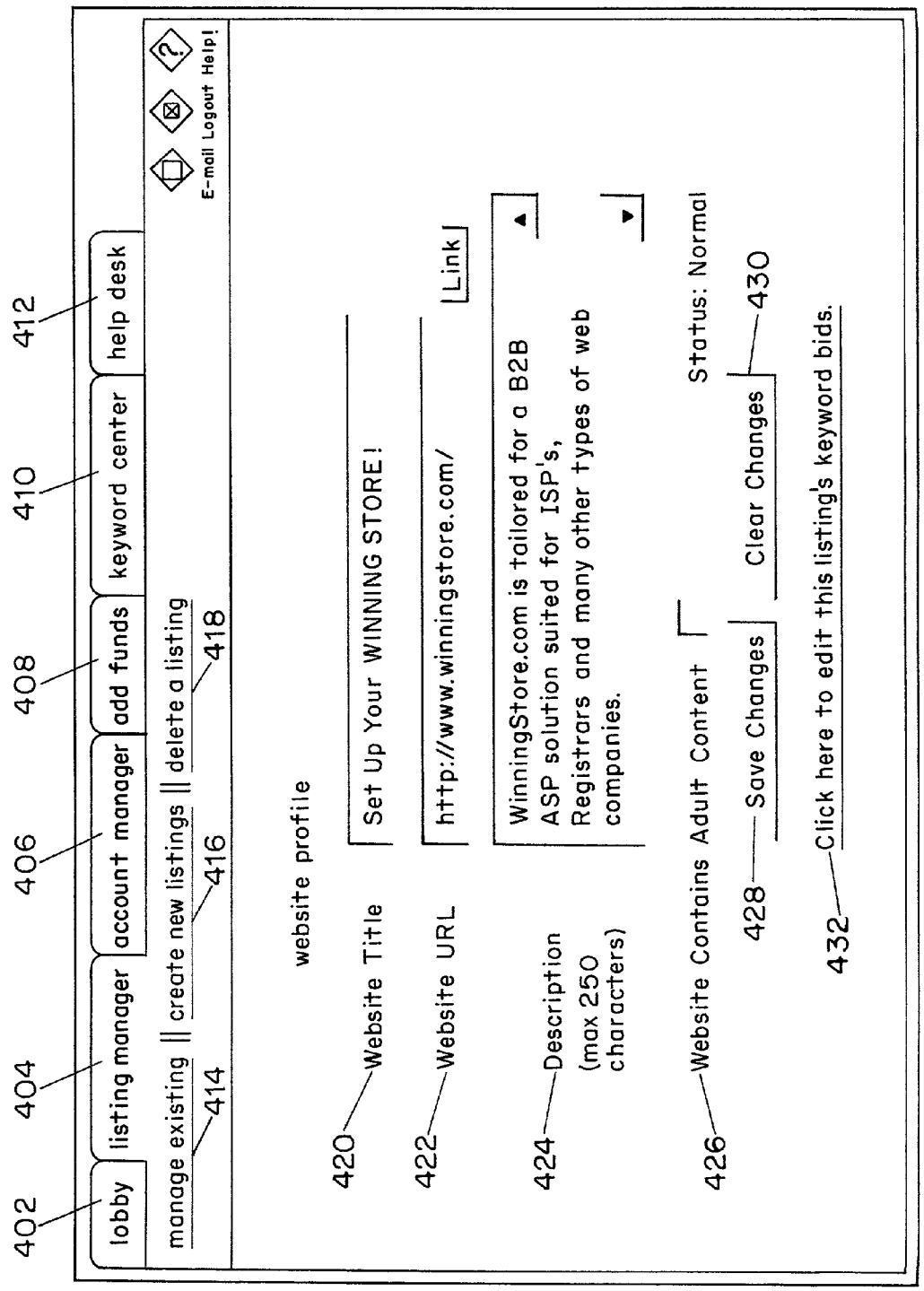
FIG. 4 is a pictorial diagram of an exemplary display screen viewed by an advertising client when accessing a listing manager portion of the server.

FIG. 4 is an exemplary screen display that would be presented on an advertising client computer 170 display when accessing a listing manager portion of the server 100. The server 100 has a number of user accessible functional areas, which are denoted as tabs, buttons, or the like, on one or more page of accessible content from server 100. For example, in FIG. 4 there is a lobby tab 402, where an advertising subscriber can find general information, a listing manager tab 402, an account manager tab 406, an add funds tab 408, a keyword center tab 410 and a help desk tab 412. Theses various user areas are selected by an advertising client, preferably by use of a GUI interface which is associated with Internet web browsing software installed in the advertising client computer unit or set top box. When a particular tab is selected, that page of content is brought forward on the display and various options and data entry fields are presented. Of course, the features of the server functions should be password protected to insure that only authorized users can access the account database.

FIG. 4 illustrates the exemplary options which can be displayed in response to the listing manager tab 404 being selected. This section of the server allows an advertising subscriber to manage an existing entry in the account database 414, create a new listing in the account database 416, or delete an entry from the account database 418. The main portion of the display illustrates a current website profile for an existing database entry. The profile generally includes a website title 420, a website address or URL 422 and a description of the content of the website 424. Optionally, a box can be provided to indicated that the website contains adult content 426. This feature can be used for filtering adult content away from minors or for indicating that such content is present so that clients can make an informed decision as to whether to access the particular site. A save changes button 428 and a clear changes button 430 may be provided to confirm or remove edits which have been entered by the advertising subscriber. In addition to title, address and description, for the pay for performance feature, the website profile must be associated with one or more purchased keywords. The website profile includes a link 432, such as a hypertext link to the advertiser keyword database portion of the account database.

Figure 5:
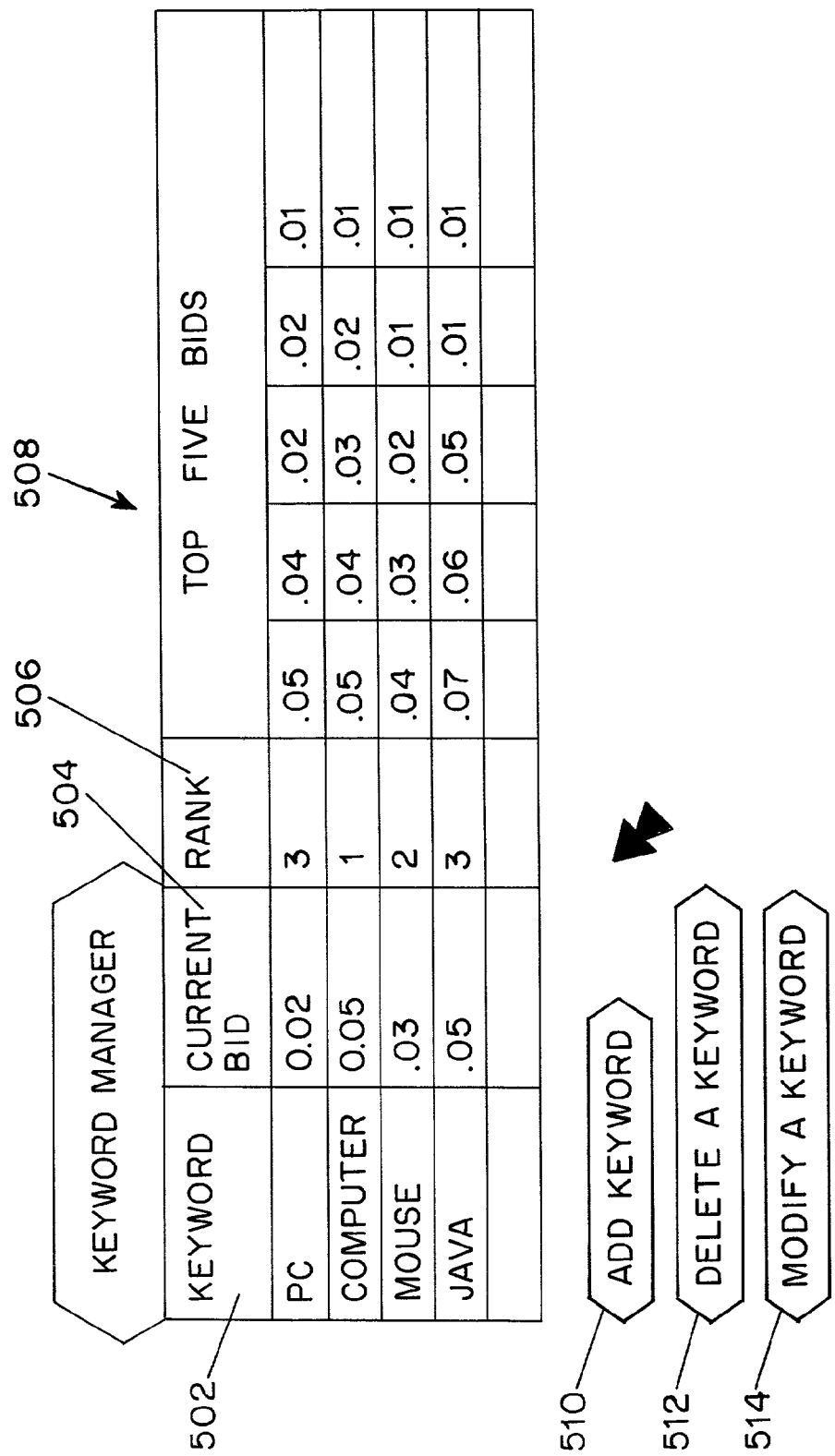
FIG. 5 is a pictorial diagram of an exemplary display screen viewed by an advertising client when accessing a keyword manager portion of the server.
Figure 6:
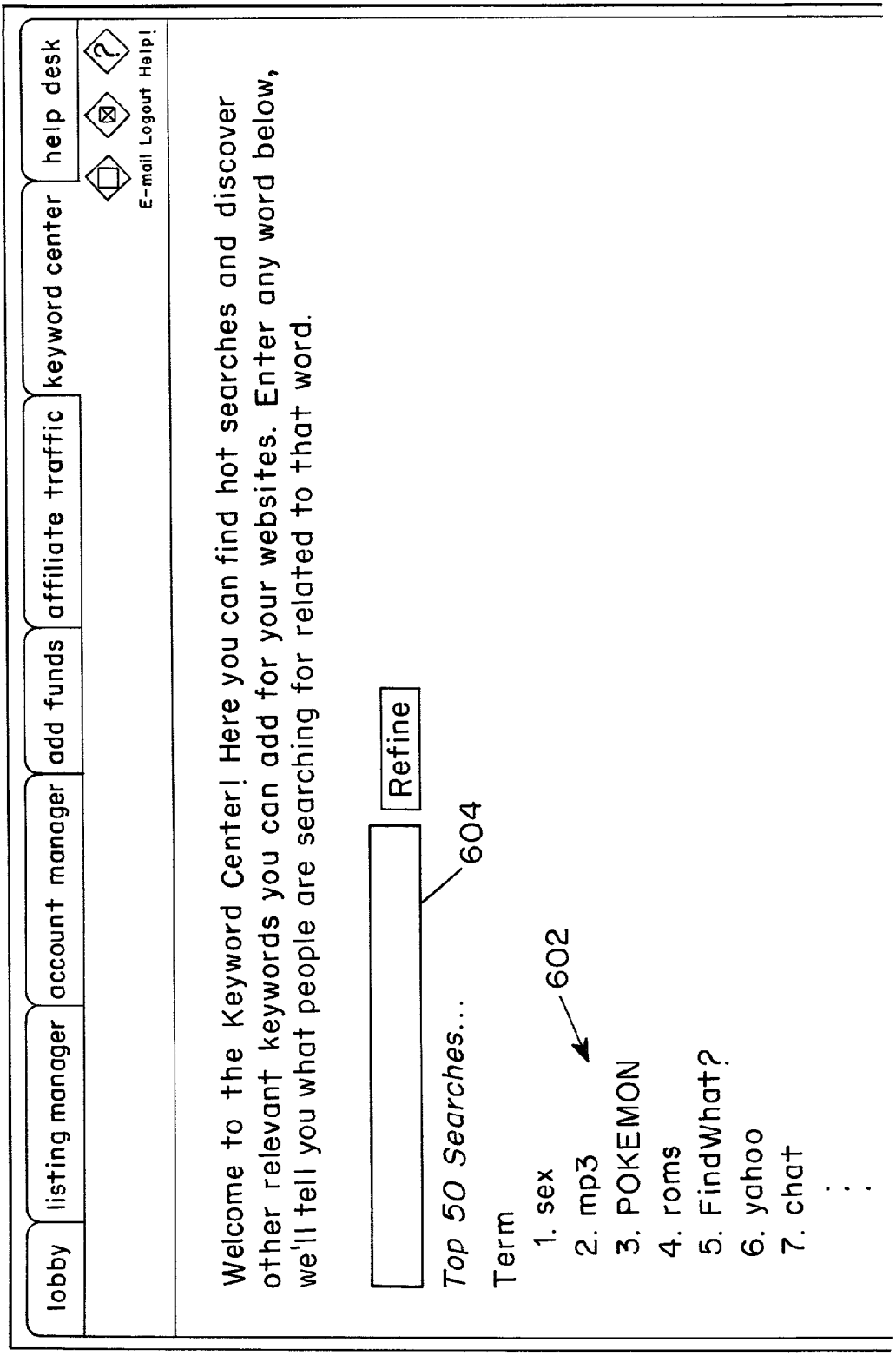
FIG. 6 is a pictorial diagram of an exemplary display screen viewed by an advertising client when accessing a keyword center/selector portion of the server.

FIG. 5 provides an exemplary keyword manager screen which can be accessed by selecting link 432. The keyword manager screen allows an authorized user to view, add, modify and delete keywords and bid denominations which are associated with a particular website profile. The keyword manager screen generally provides a listing of current keywords 502 which are associated with a given profile. The current bid 504 and bid rank 506 are also displayed in association with the keywords. In addition, the top bids, such as the top five bids, for that keyword can also be displayed. The current bid and top five bid fields generally show the amount of currency (such as U.S. $) that the advertiser is willing to pay each time that a client clicks on the listing of the website in response to a particular search using the keyword. New keywords can be added using an add keyword button 510 or link. Existing keywords can be deleted using a delete keyword button or link 512. Similarly, an existing keyword can be modified, such as by altering the spelling or bid amount, by selecting the modify a keyword button or link 514.

To assist in selecting keywords, the keyword center tab 410 can be selected and a screen display, such as that shown in FIG. 5, can be provided by the server to the advertising client. The keyword center can display the top search terms 602 used over a predefined interval, such as a week. Using a data entry field 604, an advertising subscriber can enter a term and view the types of goods and services generally being sought by query clients entering this term in a search. Alternatively, the data entry field 604 can be used for accessing a thesaurus feature to identify similar or related search terms to the term which was entered.

Figure 7:
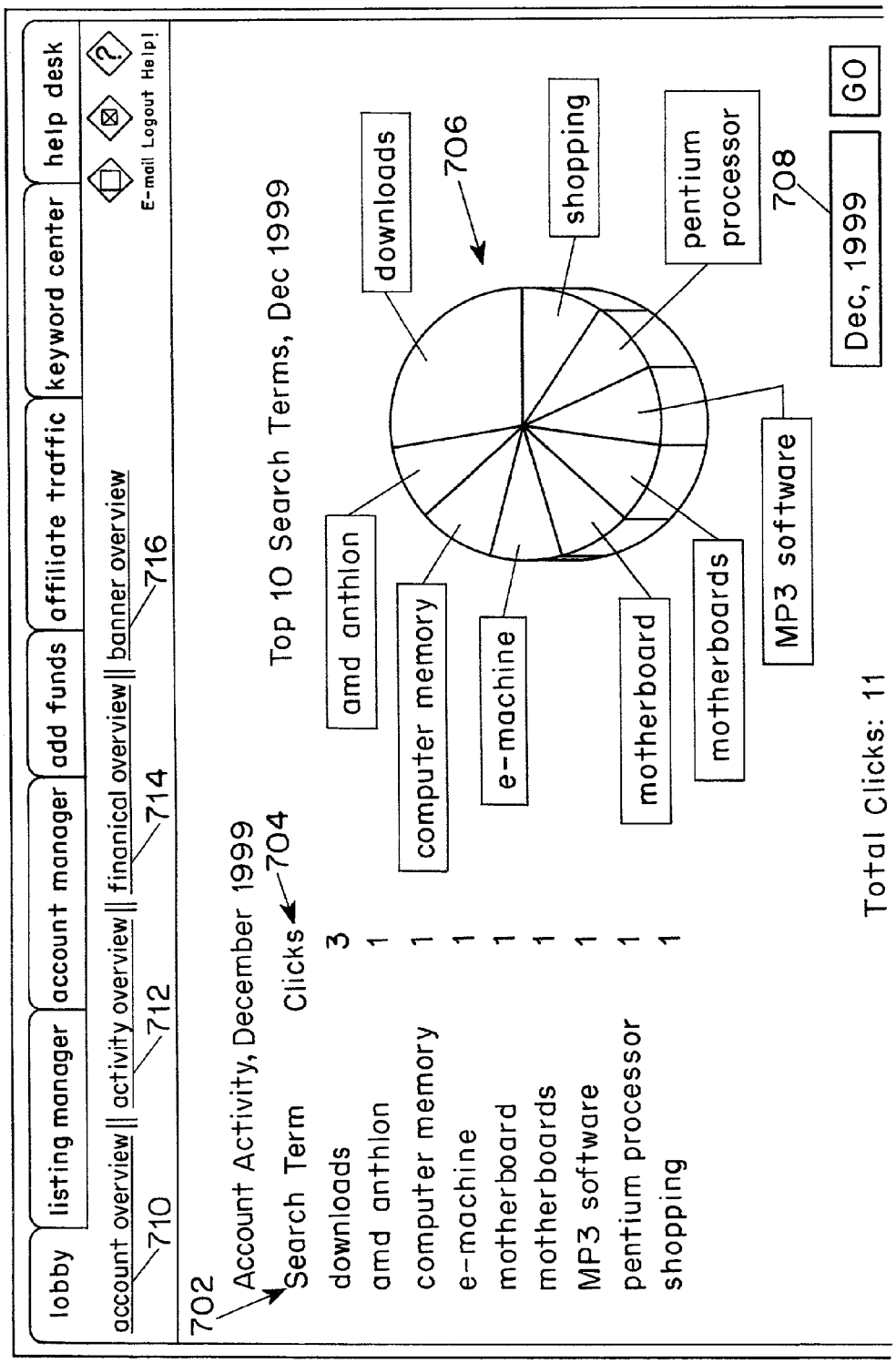
FIG. 7 is a pictorial diagram of an exemplary display screen viewed by an advertising client when accessing an account activity portion of the server.

In addition to the initial account set up and keyword management functions, the server also allows advertising subscribers to view and evaluate various account performance indicators in real time. This allows the advertisers to actively select those terms which are most effective at driving traffic to their websites and to update the current bid amount accordingly. FIG. 7 is an exemplary screen display illustrating an overview of account activity for a given website for which nine search terms have been bid upon. The display illustrates the search terms 702, the number of click throughs for each search term 704 and then presents this data in graphical form 706. The user can change the month being viewed using the month selector field 708 to review past performance. The account performance screen also includes links to other display options such as account overview 710, activity overview 712, financial overview 714 and banner overview 716, which provide real time reports with respect to various aspects of the advertisers account.

Figure 8:
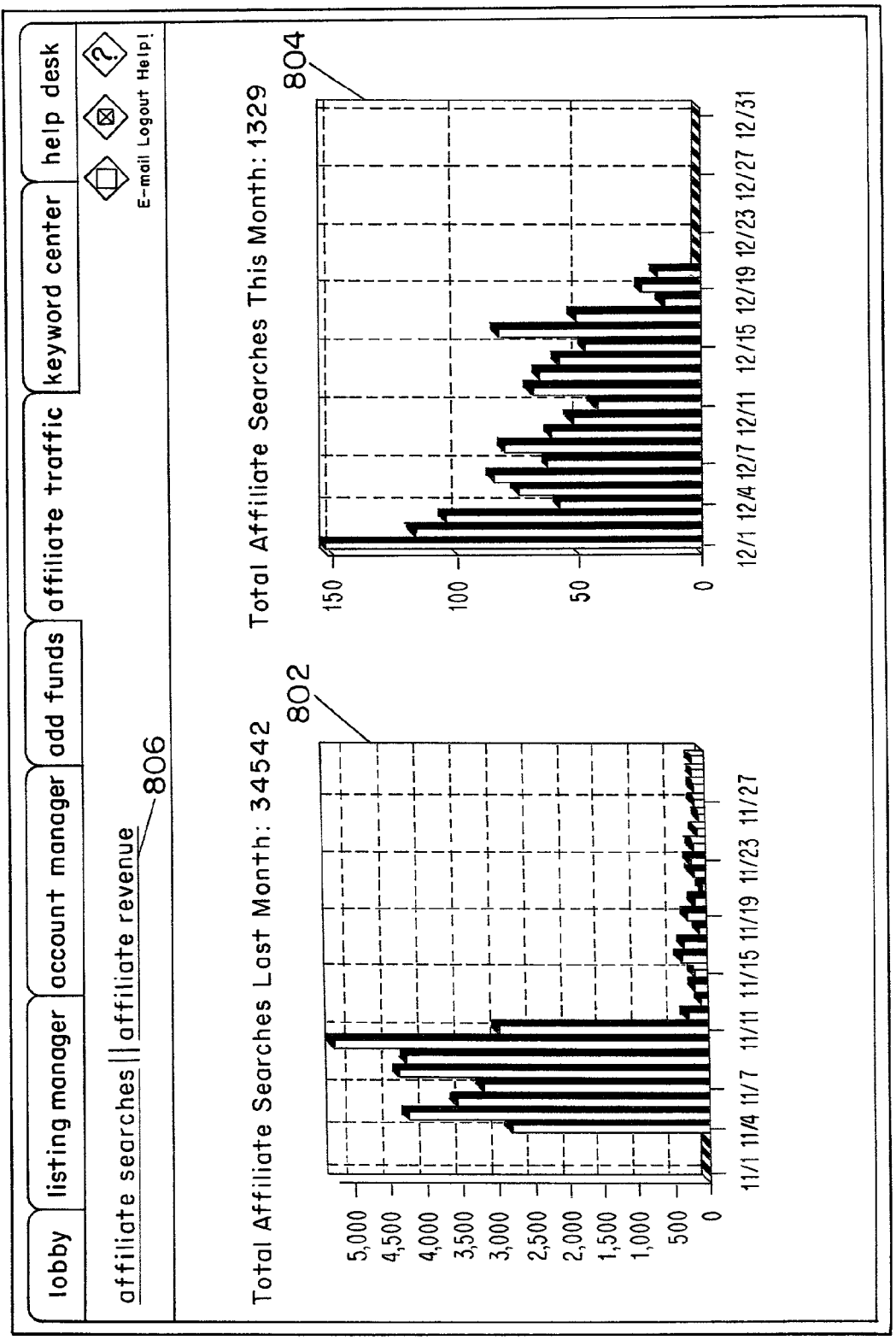
FIG. 8 is a pictorial diagram of an exemplary display screen viewed by an advertising client when accessing an affiliate traffic portion of the server illustrating affiliate traffic volume.
Figure 9:
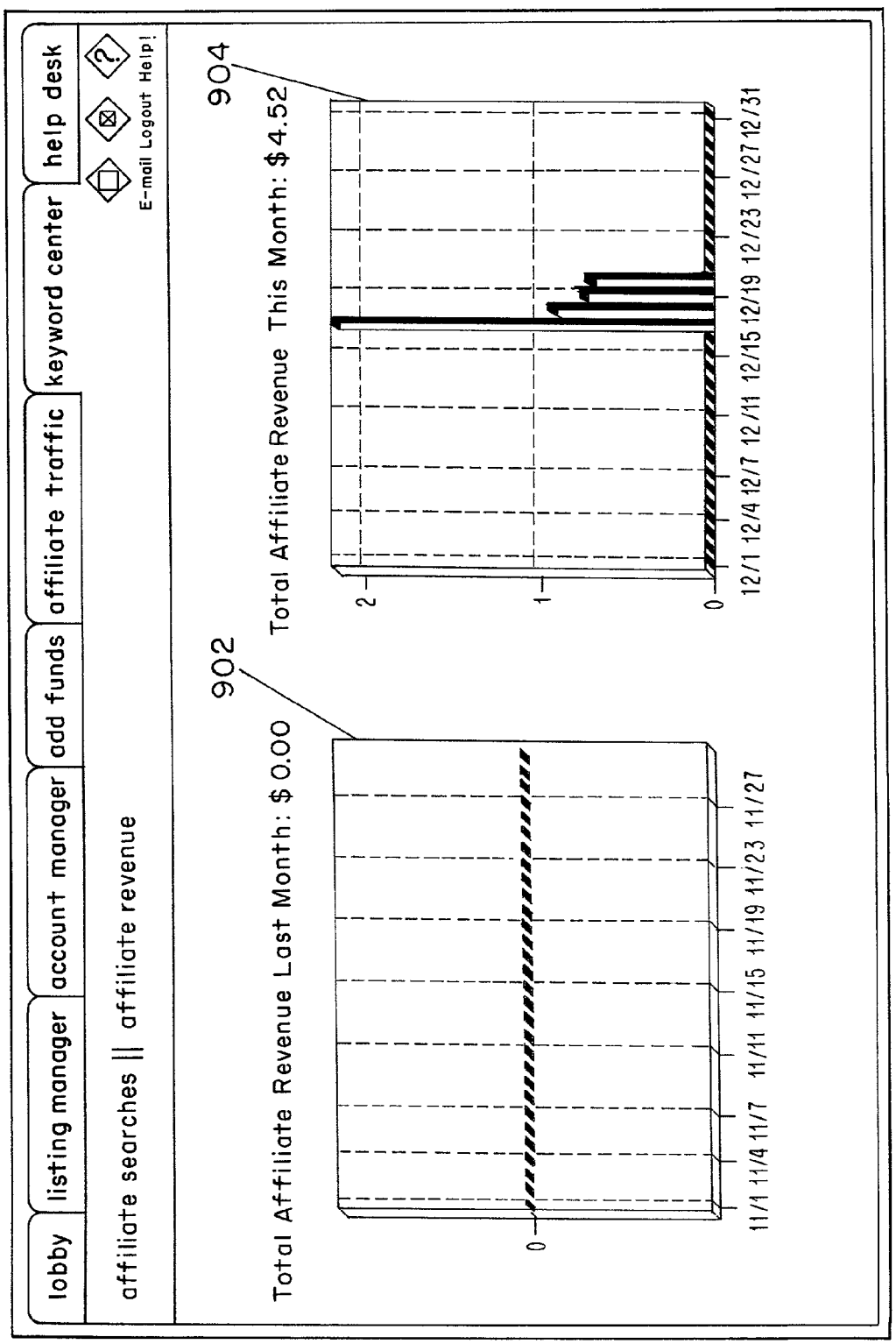
FIG. 9 is a pictorial diagram of an exemplary display screen viewed by an advertising client when accessing an affiliate traffic portion of the server illustrating affiliate traffic revenue.

FIGS. 8 and 9 are exemplary screen displays which an advertising client can use to evaluate the traffic and revenue which is provided by the affiliate service providers in the affiliate network 190. Referring to FIG. 8, two graphs are presented showing the number of affiliate searches which included one or more search terms for a given website profile in two consecutive months, such as a previous month 802 and a current month 804. By clicking on a link 806 to affiliate revenue, the amount of revenue generated by affiliate searches can be provided. Referring to FIG. 9, the amount of revenue can be illustrated as a pair of graphs showing the revenue for all of the search terms of a given website in consecutive months, such as a previous month 902 and a current month 904. By evaluating the graphs in FIG. 8, the user can evaluate determine if the selected search terms are providing an adequate amount of interest. From the graphs in FIG. 9, the advertising subscriber can determine how effective the current bid, title and description of the website are in converting searches to click through traffic.

The use of an affiliate network is a valuable way of driving a large number of unique query clients to the pay for performance advertisers database of keywords. This database can also be accessed directly by a web page associated with the server 100. In addition, the database can be accessed using a software application which can be installed directly on the query client's computer and effectively provides a short cut which directly launches the query client to the server 100. In this case a software application can be installed on the client computer either by distributing computer readable media through conventional channels, such as the mail, or by downloading the software from the server 100 or other download host computer. The software provides an active region on the client computer display, such as an icon in a Windows display environment, which can be directly accessed by the client, i.e., the client need not navigate to either the server 100 or an affiliate service provider computer to receive a search prompt. In response to the entry of a search term by the client, the software establishes a connection over the network with the server 100 such that the search can be processed in a manner as described above. After the software is initially launched and the server 100 is accessed, the client receives search results and can act on those search results in a manner consistent with that described above with respect to FIGS. 1 and 2.

The present system and method for marketing using a pay for performance search engine system allows advertisers to reach relevant customers by purchasing one or more keywords which are closely related to the goods and services offered by the advertiser. The customer benefits from the pay for performance search results in that relevance of the results is highly likely since the advertiser is paying for each "click through" of a payed for search result hit. The advertiser benefits in that only actual click-throughs, i.e., traffic to the advertisers site, are paid for, rather than paying for a large number passive views of advertising content. The real-time processing of the account processing section allows advertisers to establish an account and purchase key words immediately, without the need to wait for payment to be mailed in to the service provider or billed at a later date. the real time processing also allows advertisers to immediately see the high bids currently being paid for the top placements of a desired key word. The use of an affiliate network provides broad access to the advertiser keyword database to a large number of unique clients without the search server requiring high profile brand equity. Affiliate service providers benefit in that they are compensated when one of their users acts upon the results of as search conducted through the affiliate.

It will be appreciated that the various processing blocks can be implemented on a single computer or on multiple computers which are interconnected via a network. It will be further appreciated that the various operations described herein can be implemented in numerous combinations of hardware and software, all of which are within the scope of the present invention.

What is claimed is:

1. A system for marketing distribution over a computer network comprising:
    a data network;
    at least one advertising client computer coupled to said data network;
    at least one affiliate service provider computer coupled to said data network;
    at least one query client computer coupled to said at least one affiliate service provider computer via said data network and associated with said at least one affiliate service provider; and
    a server computer operatively coupled to said data network, the server computer further comprising:
        an advertiser account database;
        an advertiser keywords database, the advertiser keywords database having a plurality of keyword entries and entry denominations which are associated with advertising content pages of said at least one advertising client computer;
        a query processing subsection, the query processing subsection being operatively coupled to said advertiser keywords database, the query processing subsection being responsive to at least one search term entered on said at least one query client computer and provided to said server computer via said at least one affiliate service provider computer associated with said at least one query client computer, the query processing subsection returning search results to said query client computer including those entries in the advertiser keywords database which match the at least one search term entered by the query client computer, the search results being ordered in accordance with the denomination associated with the entries in the advertiser keyword database and having a link to the associated advertising content pages, wherein the server computer receives an indication if the query client computer selects to view the advertising content pages associated with an entry in the search results and an indication of the affiliate service provider computer associated with the query client computer entering the search;
    wherein the server computer, upon receiving a request for placing an entry in the advertiser keywords database from one of said advertising client computers, performs a relevancy determination between content offered by the advertising client computer and the selected keyword, the relevancy determination comprising:
        determining at least one category of goods and services associated with the content offered by the advertising computer,
        determining at least one potential category for the selected keyword; and
        accepting the entry only if the at least one category of goods and services is associated with the at least one potential category.

2. The system for marketing distribution over a computer network according to claim 1, wherein the server computer debits an entry in the account database associated with the advertising client computer of the selected advertising content pages an amount equal to the denomination associated with the keyword in the selected entry in the search results.

3. The system for marketing distribution over a computer network according to claim 1, wherein the server computer credits an entry in the account database associated with the at least one affiliate service provider computer associated with the query client computer entering the search.

4. The system for marketing distribution over a computer network according to claim 1, wherein the credit is at least a portion of the denomination associated with the keyword in the selected entry in the search results.

5. The system for marketing distribution over a computer network according to claim 1, wherein the denomination is a cash amount that will be paid by the operator of the advertising client computer when the entry associated with the keyword is selected by a query client computer.

6. The system for marketing distribution over a computer network according to claim 1, wherein the at least one affiliate service provider is provided with a software application associated with said server computer, the software application providing a search engine interface display to said at least one query client computer, receiving search terms entered at said at least one query client computer, and providing said search terms to said server computer.

7. The system for marketing distribution over a computer network according to claim 1, wherein the server computer further comprises an account processing subsection, said account processing subsection providing access for authorized users to said account database and said advertiser keywords database.

8. The system for marketing distribution over a computer network according to claim 7, wherein the access provided by said account processing subsection allows authorized users to view and modify at least a portion of the entries in the account database and advertiser keywords database in real-time.

9. The system for marketing distribution over a computer network according to claim 1, wherein the affiliated service provider computer associated with the query client computer comprises an affiliated service provider computer which refers the query client entering the search to the server computer.

10. The system of claim 1, wherein the server computer disallows the advertising computer from bidding on the selected keyword if the at least one category of goods and services is not associated with the at least one potential category.

11. The system of claim 1, wherein the request for placing an entry in the advertiser keywords database includes a new keyword not previously in the advertiser keywords database, the new keyword defining the selected keyword.

12. The system of claim 1, wherein the request for placing an entry in the advertiser keywords database includes a keyword presently existing in the advertiser keywords database, the presently existing keyword defining the selected keyword.

13. A method for marketing distribution over a computer network comprising:
    maintaining an advertiser keyword database having a plurality of entries which are associated with advertising content pages, each of said plurality of entries including at least one keyword and a denomination associated with the keyword;

providing a search interface to a plurality of affiliate service providers, the search interface providing access to the advertiser keyword database for users of the affiliate service providers;

receiving at least one keyword entered in the search interface by a user of an affiliate service provider;

searching the advertiser keyword database to find entries which match the at least one keyword entered in the search;

returning the matching entries from the search, ordered in accordance with the denominations associated with said entries, to the user of an affiliate service provider;

receiving an indication if the query client computer selects to view the advertising content pages associated with an entry in the search results and an indication of the affiliate service provider computer associated with the query client computer entering the search; and debiting an advertisers account for the value of the denomination associated with the selected entry;

wherein said step of maintaining an advertiser keyword database further comprises performing a relevancy determination between a selected keyword and at least one advertising content page for the selected keyword and only adding an entry for the selected keyword in the advertiser keyword database if a minimum relevancy threshold is satisfied, the relevancy determination comprising:

determining at least one category of goods and services associated with a content offered by the at least one advertising content page;

determining at least one potential category for the selected keyword: and accepting the entry only if the at least one category of goods and services is associated with the at least one potential category.

14. The method for marketing distribution over a computer network according to claim 13, further comprising the step of crediting an account of the affiliate service provider associated with the query client computer entering the search for a value which is at least a portion of the denomination associated with the selected entry.

15. The method for marketing distribution over a computer network according to claim 13, further comprising providing real-time access to authorized users of the advertisers account and allowing the authorized user to view account activity and modify the keyword account database entries.

16. The method for marketing distribution ever a computer network according to claim 13, wherein the step of receiving an indication if the query client computer selects to view the advertising content pages associated with an entry in the search results and an indication of the affiliate service provider computer associated with the query client computer entering the search comprises receiving an indication of the affiliate service provider computer which refers the query client computer entering the search to the server computer.

17. The system for marketing distribution over a computer network according to claim 13, wherein the affiliated service provider computer associated with the query client computer comprises an affiliated service provider computer which refers the query client entering the search to the server computer.

18. The method of claim 13, further comprising disallowing an advertiser to bid on the selected keyword if at least one category of goods and services associated with content offered by at least one advertising content page of the advertiser is not associated with the at least one potential category.

19. A system for marketing distribution over a computer network comprising:

a data network;

at least one advertising client computer coupled to said data network;

a plurality of affiliate service provider computers coupled to said data network;

at least one query client computer coupled to said at least one of said affiliate service provider computers via said data network and associated therewith; and a server computer operatively coupled to said data network, the server computer further comprising:

an advertiser account database;

an advertiser keywords database, the advertiser keywords database having a plurality of keyword entries and entry denominations which are associated with advertising content pages of said at least one advertising client computer;

a query processing subsection, the query processing subsection being operatively coupled to said advertiser keywords database, the query processing subsection being responsive to at least one search term entered on said at least one query client computer and provided to said server computer via one of said affiliate service provider computers associated with the at least one query client computer, the query processing subsection returning search results to said query client computer including those entries in the advertiser keywords database which match the at least one search term entered by the query client computer, the search results being ordered in accordance with the denomination associated with the entries in the advertiser keyword database and having a link to the associated advertising content pages, wherein the server computer receives an indication if the query client computer selects to view the advertising content pages associated with an entry in the search results and an indication of the affiliate service provider computer associated with the query client computer entering the search;

wherein the server computer, upon receiving a request for placing an entry in the advertiser keywords database from one of said advertising client computers, performs a relevancy determination between content offered by the advertising client computer and the selected keyword, said server only accepting the entry if a minimum relevancy threshold is satisfied; and the relevancy determination comprising:

accepting the entry only if at least one of the selected keyword and an equivalent to the selected keyword from a thesaurus database is present in at least one of a title of at least one advertising content page of said at least one advertising computer, a description of at least one advertising content page of said at least one advertising computer, and a content of at least one advertising content page of said at least one advertising computer.

20. The system for marketing distribution over a computer network according to claim 19, wherein the server computer debits an entry in the account database associated with the advertising client computer of the selected advertising content pages an amount equal to the denomination associated with the keyword in the selected entry in the search results.

21. The system for marketing distribution over a computer network according to claim 19, wherein the server computer credits an entry in the account database associated with one of said affiliate service provider computers associated with the query client computer entering the search.

22. The system for marketing distribution over a computer network according to claim 19, wherein the credit is at least a portion of the denomination associated with the keyword in the selected entry in the search results.

23. The system for marketing distribution over a computer network according to claim 19, wherein the denomination is a cash amount that will be paid by the operator of the advertising client computer when the entry associated with the keyword is selected by a query client computer.

24. The system for marketing distribution over a computer network according to claim 19, wherein at least one of said affiliate service providers is provided with a software application associated with said server computer, the software application providing a search engine interface display to said at least one query client computer, receiving search terms entered at said at least one query client computer, and providing said search terms to said server computer.

25. The system for marketing distribution over a computer network according to claim 19, wherein the server computer further comprises an account processing subsection, said account processing subsection providing access for authorized users to said account database and said advertiser keywords database.

26. The system for marketing distribution over a computer network according to claim 25, wherein the access provided by said account processing subsection allows authorized users to view and modify at least a portion of the entries in the account database and advertiser keywords database in real-time.

27. A system for marketing distribution over a computer network comprising:
   a data network;
   at least one advertising client computer coupled to said data network;
   at least one affiliate service provider computer coupled to said data network;
   at least one query client computer coupled to said at least one affiliate service provider computer via said data network and associated with said at least one affiliate service provider; and
   a server computer operatively coupled to said data network, the server computer further comprising:
   an advertiser account database;
   an advertiser keywords database, the advertiser keywords database having a plurality of keyword entries and entry denominations which are associated with advertising content pages of said at least one advertising client computer;
   a query processing subsection, the query processing subsection being operatively coupled to said advertiser keywords database, the query processing subsection being responsive to at least one search term entered on said at least one query client computer and provided to said server computer, the query processing subsection returning search results to said query client computer including those entries in the advertiser keywords database which match the at least one search term entered by the query client computer, the search results being ordered in accordance with the denomination associated with the entries in the advertiser keyword database and having a link to the associated advertising content pages, wherein the server computer receives an indication if the query client computer selects to view the advertising content pages associated with an entry in the search results and an indication of the affiliate service provider computer associated with the query client computer entering the search;
   wherein the server computer, upon receiving a request for placing an entry in the advertiser keywords database from one of said advertising client computers, performs a relevancy determination between content offered by the advertising client computer and the selected keyword, said server only accepting the entry if a minimum relevancy threshold is satisfied; and
   determining at least one category of goods and services associated with content of the advertising content pages of the advertising client computer,
   determining at least one potential category for the selected keyword, and
   accepting the entry only if the at least one category of goods and services is associated with the at least one potential category.

28. The system for marketing distribution over a computer network according to claim 27, wherein the affiliated service provider associated with the query client computer comprises an affiliated service provider which refers the query client entering the search to the server computer.

29. The system for marketing distribution over a computer network according to claim 27, wherein the affiliated service provider associated with the query client computer comprises an affiliated service provider which transmits the at least one search term entered on the query client computer to the server computer.

30. A server for a system for marketing distribution over a computer network, the computer network comprising:
   a data network;
   at least one advertising client computer coupled to said data network;
   at least one affiliate service provider computer coupled to said data network;
   at least one query client computer coupled to said at least one affiliate service provider computer via said data network and associated with said at least one affiliate service provider; and
the server operatively coupled to said data network and comprising:
   an advertiser account database;
   an advertiser keywords database, the advertiser keywords database having a plurality of keyword entries and entry denominations which are associated with advertising content pages of said at least one advertising content computer;
   a query processing subsection, the query processing subsection being operatively coupled to said advertiser keywords database, the query processing subsection being responsive to at least one search term entered on said at least one query client computer and provided to said server computer via said at least one affiliate service provider computer associated with said at least one query client computer, the query processing subsection returning search results to said query client computer including those entries in the advertiser keywords database which match the at least one search term entered by the query client computer, the search results being ordered in accordance with the denomination associated with the entries in the advertiser keyword database and having a link to the associated advertising content pages;
   wherein the server computer receives an indication if the query client computer selects to view the advertising content pages associated with an entry in the search results and an indication of the affiliate service provider computer associated with the query client computer entering the search;

the server computer, upon receiving a request for placing an entry in the advertiser keywords database from one of said advertising client computers, performs a relevancy determination between content offered by the advertising client computer and the selected keyword, said server only accepting the entry if a minimum relevancy threshold is satisfied; and the relevancy determination comprising:

determining at least one category of goods and services associated with content of the advertising content pages of the advertising client computer, determining at least one potential category for the selected keyword, and accepting the entry only if the at least one category of goods and services is associated with the at least one potential category.

31. A computer for a system for marketing distribution over a computer network, comprising:

an advertiser account database;

an advertiser keywords database, the advertiser keywords database having at least one keyword entry and at least one entry denomination, each of which are associated with at least one advertising content page;

a query processing subsection operatively connected to said advertiser keywords database and responsive to at least one search, the query processing subsection operative to return search results including those entries in the advertiser keywords database which match the at least one search term;

wherein the search results are ordered in accordance with the denomination associated with the entries in the advertiser keyword database and have a link to the associated advertising content page; and the computer, upon receiving a request for placing an entry in the advertiser keywords database, performs a relevancy determination between content offered by an advertiser associated with the request and the selected keyword, said computer only accepting the entry if a minimum relevancy threshold is satisfied;

wherein the relevancy determination comprises:

determining at least one category of goods and services of the content offered by the advertiser;

determining at least one potential category for the selected keyword, and accepting the entry only if the at least one category of goods and services is associated with the at least one potential category.

\* \* \* \* \*